(12) United States Patent
Hashimoto et al.

(10) Patent No.: US 10,104,837 B2
(45) Date of Patent: Oct. 23, 2018

(54) AUTONOMOUS LAWN MOWER

(71) Applicant: HONDA MOTOR CO., LTD., Tokyo (JP)

(72) Inventors: Takeshi Hashimoto, Wako (JP); Susumu Okubo, Wako (JP); Kenta Kawanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/363,937

(22) Filed: Nov. 29, 2016

(65) Prior Publication Data

US 2017/0181375 A1    Jun. 29, 2017

(30) Foreign Application Priority Data

Dec. 25, 2015 (JP) ................. 2015-252871

(51) Int. Cl.
*A01D 34/74* (2006.01)
*A01D 34/81* (2006.01)
(Continued)

(52) U.S. Cl.
CPC ........... *A01D 34/74* (2013.01); *A01D 34/008* (2013.01); *A01D 34/78* (2013.01); *A01D 34/81* (2013.01);
(Continued)

(58) Field of Classification Search
CPC ...... A01D 34/008; A01D 34/54; A01D 34/74; A01D 34/81
See application file for complete search history.

(56) References Cited

U.S. PATENT DOCUMENTS 5,507,137 A * 4/1996 Norris ............... A01D 34/008
                                              56/10.2 A
7,117,660 B1 * 10/2006 Colens ............. A01D 34/008
                                              56/10.2 A
(Continued)

FOREIGN PATENT DOCUMENTS

DE    10 2010 044 276 A1    3/2012
DE    20 2013 006 712 U1    8/2013
(Continued)

OTHER PUBLICATIONS

European Search Report dated Mar. 14, 2017 for European Patent Application No. 16199944.6. (6 pages).

*Primary Examiner* — Alicia Torres
(74) *Attorney, Agent, or Firm* — Fitzpatrick, Cella, Harper & Scinto

(57) ABSTRACT

An autonomous lawn mower, comprising a traveling frame provided with traveling wheels, a motor holding member for vertically moving while holding a cutter blade driving motor, a vertical driving member vertically moving the motor holding member, and one of a vertical driving motor or a manual driving mechanism, the vertical driving motor electrically driving the vertical driving member, the manual driving mechanism manually driving the vertical driving member, the frame including a support portion for supporting the vertical driving member, a motor mounting portion for mounting the vertical driving motor, and a manual driving mechanism mounting portion for mounting the manual driving mechanism, and, when the frame is viewed from above, the motor mounting portion and the manual driving mechanism mounting portion are positioned in different phases around the support portion.

7 Claims, 8 Drawing Sheets

(51) Int. Cl.
*A01D 34/00* (2006.01)
*A01D 34/78* (2006.01)
*A01D 69/02* (2006.01)
*A01D 101/00* (2006.01)

(52) U.S. Cl.
CPC .......... *A01D 69/02* (2013.01); *A01D 2101/00* (2013.01)

(56) References Cited

U.S. PATENT DOCUMENTS

2009/0183482 A1* 7/2009 Cheung ................. A01D 34/68
56/17.1
2011/0302893 A1* 12/2011 Park ..................... A01D 34/824
56/17.1
2015/0181805 A1* 7/2015 Elonsson ............. A01D 34/008
56/14.7

FOREIGN PATENT DOCUMENTS

| EP | 2422602 A1 * | 2/2012 | ............ A01D 34/74 |
| EP | 2 425 701 A2 | 3/2012 | |
| EP | 2 783 563 A1 | 10/2014 | |
| EP | 2783563 A1 * | 10/2014 | ............ A01D 34/74 |
| WO | 2014-007694 A1 | 1/2014 | |
| WO | 2014/007696 A1 | 1/2014 | |

\* cited by examiner

AUTONOMOUS LAWN MOWER

CROSS-REFERENCE TO RELATED APPLICATION

This application is based upon and claims the benefit of priority from the prior Japanese Patent Application No. 2015-252871, filed on Dec. 25, 2015, the entire contents of which are incorporated herein by reference.

BACKGROUND OF THE INVENTION

Field of the Invention

The present invention relates to a technique of improving an autonomous lawn mower.

Description of the Related Art

Lawn mowers include an autonomous lawn mower capable of autonomously traveling without being steered by a worker. This autonomous lawn mower can automatically travel on the lawn by traveling wheels, and mow the lawn by a cutter blade which rotates almost horizontally, and is known as a so-called robotic lawn mower.

A lawn mowing motor for driving the cutter blade is held by a motor holding member. The height of the lawn mowing motor can be adjusted by vertically moving the motor holding member with respect to a frame including the traveling wheels. Consequently, it is possible to adjust the height of the cutter blade with respect to the lawn, that is, a so-called lawn mowing height. The method of vertically moving the motor holding member includes an electrical operation method known from International Publication No. 2014/007694, and a manual operation method known from European Patent Application Publication No. 2783563.

An autonomous lawn mower known by International Publication No. 2014/007694 includes a motor holding member holding a lawn mowing motor, a rack provided on the motor holding member, a screw portion for vertically moving the motor holding member by being meshed with the rack, and a gear driving motor for driving the screw portion. The motor holding member, screw portion, and gear driving motor are attached to a frame. The rotation of the motor holding member and rack is regulated, but the vertical movement thereof is permitted. The rack vertically moves when the gear driving motor rotates the screw portion. As a consequence, the motor holding member vertically moves, so the heights of the lawn mowing motor and a cutter blade can be adjusted.

An autonomous lawn mower known by European Patent Application Publication No. 2783563 includes a motor holding member holding a lawn mowing motor, a vertical driving member for vertically moving the motor holding member, and a manual driving mechanism for manually driving the vertical driving member. The motor holding member, vertical driving member, and manual driving mechanism are attached to a frame. The rotation of the motor holding member is regulated, but the vertical movement thereof is permitted. The vertical movement of the vertical driving member is regulated, but the rotation thereof is permitted. The manual driving mechanism includes a driven gear provided in the vertical driving member, a driving gear meshed with the driven gear, and an operation knob for manually rotating the driving gear. The vertical driving member rotates when the operation knob is rotated. Consequently, the motor holding member vertically moves, so the heights of the lawn mowing motor and a cutter blade can be adjusted.

A method of vertically moving the motor holding member is appropriately set in accordance with the machine type of an autonomous lawn mower. However, an electric type vertical driving device and manual type vertical driving device are largely different in arrangement, so the number of dedicated parts of each method is large. This is disadvantageous in reducing the production cost of an autonomous lawn mower because it is necessary to produce the dedicated parts of each method.

SUMMARY OF THE INVENTION

It is an object of the present invention to provide a technique capable of producing an autonomous lawn mower by selecting an electrical operation method and manual operation method, and yet reducing the production cost.

One of the present invention provides an autonomous lawn mower, comprising a traveling frame provided with traveling wheels, a motor holding member, on the traveling frame, configured to vertically move while holding a cutter blade driving motor, a vertical driving member, on the traveling frame, configured to vertically move the motor holding member, and one of a vertical driving motor or a manual driving mechanism on the traveling frame, the vertical driving motor being configured to electrically drive the vertical driving member, and the manual driving mechanism being configured to manually drive the vertical driving member, wherein the traveling frame includes a support portion configured to support the vertical driving member, a motor mounting portion configured to mount the vertical driving motor, and a manual driving mechanism mounting portion configured to mount the manual driving mechanism, and, when the traveling frame is viewed from above, the motor mounting portion and the manual driving mechanism mounting portion are positioned in different phases around the support portion.

Further features of the present invention will become apparent from the following description of exemplary embodiments with reference to the attached drawings.

DESCRIPTION OF THE EMBODIMENTS

Embodiments for carrying out the present invention will be explained below with reference to the accompanying drawings.

<Embodiment>

An autonomous lawn mower according to this embodiment will be explained with reference to the accompanying drawings. Note that Fr, Rr, Le, and Ri respectively indicate the front side, rear side, left side, and right side.

Figure 1:
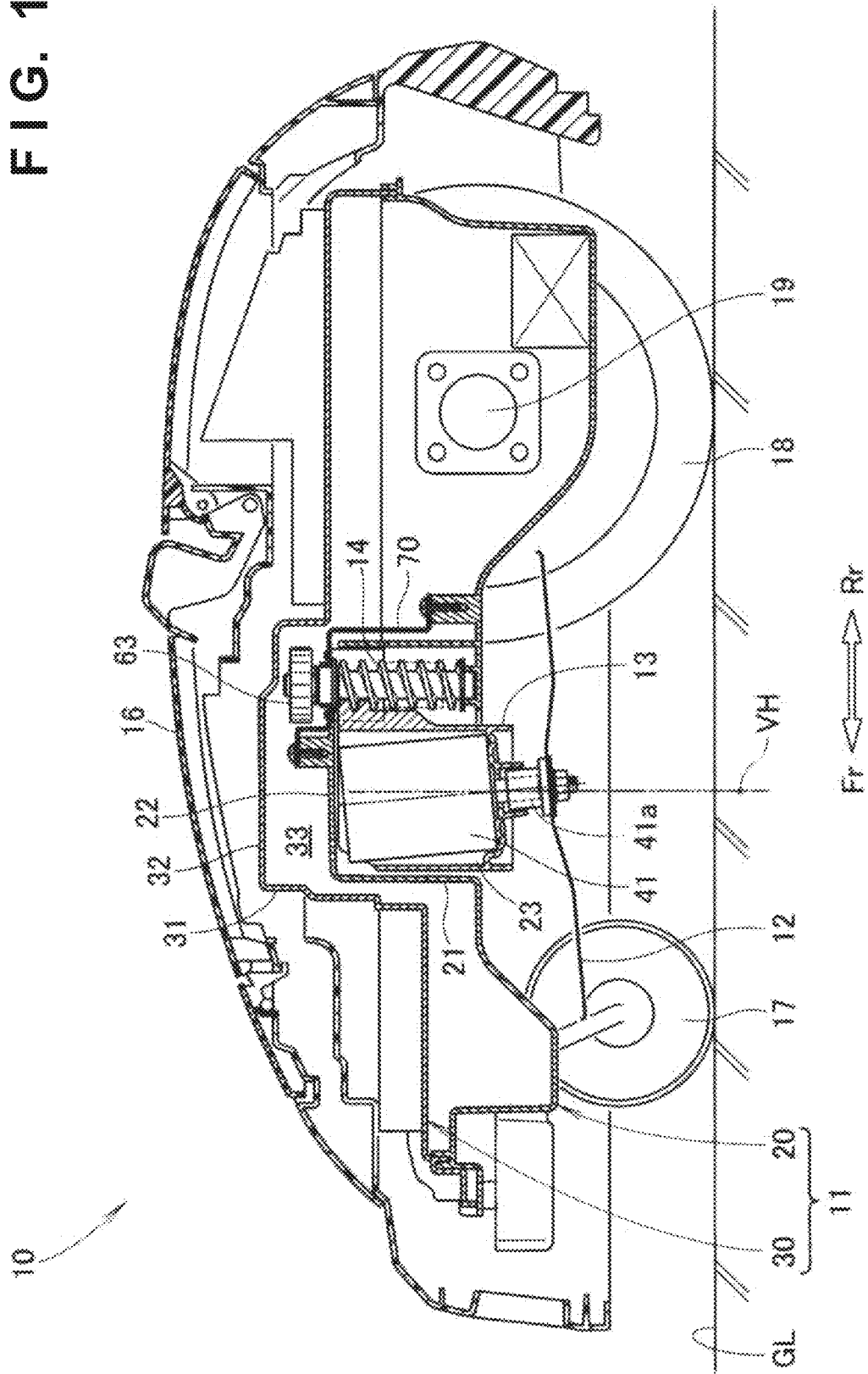
FIG. 1 is a sectional view showing an autonomous lawn mower according to the present invention sideways.

As shown in FIG. 1, an autonomous lawn mower 10 is a kind of a working machine capable of autonomously traveling without being steered by a worker. The autonomous lawn mower 10 can cut the grass by a cutter blade 12 which rotates almost horizontally while automatically traveling on lawn GL by four traveling wheels 17 and 18 (only the right side is shown), and is known as a so-called robotic lawn mower. The autonomous lawn mower 10 will simply be abbreviated as "the lawn mower 10" hereinafter.

The lawn mower 10 includes a traveling frame 11, the cutter blade 12, a motor holding member 13, a vertical driving member 14, a driving mechanism 15 (see FIG. 3), and a decorative cover 16. The motor holding member 13, vertical driving member 14, and driving mechanism 15 are installed in the traveling frame 11. The traveling frame 11 includes an under frame 20 having the four traveling wheels 17 and 18, and an upper frame 30 provided on the under frame 20. The upper frame 30 is attached to the under frame 20 so as to be detachable. Furthermore, the upper frame 30 is covered with the decorative cover 16 from above. The decorative cover 16 is attached to the upper frame 30 so as to be detachable.

The four traveling wheels 17 and 18 are left and right front wheels 17 in the front portion of the traveling frame 11, and left and right rear wheels 18 in the rear portion of the traveling frame 11. The left and right rear wheels 18 are individually driven by left and right traveling electric motors 19 (left and right electric motors 19). The lawn mower 10 travels straight forward or backward when the left and right traveling electric motors 19 rotate forward at equal speeds, or rotate reversely at equal speeds. Also, the lawn mower 10 turns when one of the left and right traveling electric motors 19 rotates reversely.

The cutter blade 12 (a lawn mowing unit 12) is positioned below the center of the traveling frame 11, and driven by a cutter blade driving motor 41. The cutter blade driving motor 41 has an output shaft 41a which extends to a portion below the traveling frame 11, that is, extends toward the lawn GL below from the lower end. The output shaft 41a extends in the vertical direction of the traveling frame 11, and is almost perpendicular to the horizontal lawn GL, that is, the ground GL. Preferably, the output shaft 41a slightly inclines backward and downward from above with respect to a vertical line VH. This prevents the cutter blade 12 from rubbing the lawn surface after the lawn mower 10 travels forward and the cutter blade 12 cuts the grass.

Figure 2:
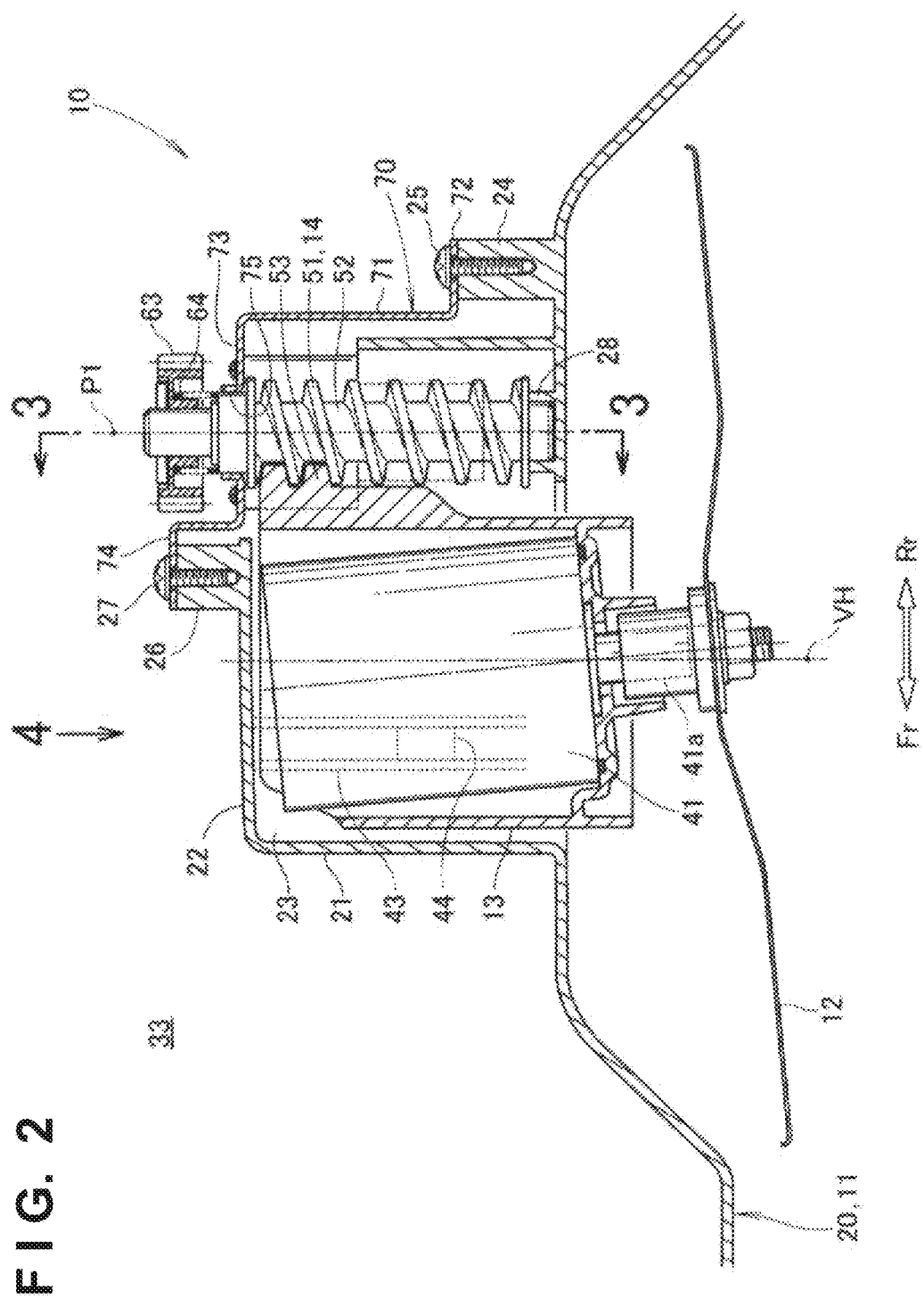
FIG. 2 is an enlarged view of a traveling frame, cutter blade, cutter blade driving motor, motor holding member, vertical driving member, and driving mechanism shown in FIG. 1.

As shown in FIGS. 1 and 2, the upper frame 30 is positioned above the under frame 20 with a predetermined spacing between them. Accordingly, an accommodating portion 33 (a transmitting mechanism accommodating portion 33) is formed between the under frame 20 and upper frame 30. The transmitting mechanism accommodating portion 33 will be explained in detail below.

A swollen portion 21 which swells upward and has an almost rectangular shape in a planar view is integrated with the upper surface of the center of the under frame 20. The swollen portion 21 will be referred to as the under-frame-side swollen portion 21 hereinafter. A top plate 22 of the under-frame-side swollen portion 21 is an almost horizontal flat plate. An accommodating space 23 having an open lower end is formed inside the under-frame-side swollen portion 21. The accommodating space 23 will be referred to as "the under-frame-side accommodating portion 23" or simply referred to as "the accommodating portion 23" hereinafter.

A swollen portion 31 which swells upward is integrated with a portion of the upper frame 30, which overlaps the swollen portion 31, when the lawn mower 10 is viewed from above. The interior of the swollen portion 31 has an open lower end. The swollen portion 31 will be referred to as the upper-frame-side swollen portion 31. A top plate 32 of the upper-frame-side swollen portion 31 is an almost horizontal flat plate, and almost parallel to the top plate 22 of the under-frame-side swollen portion 21.

The upper-frame-side swollen portion 31 practically (almost) covers the upper half of the under-frame-side swollen portion 21. The top plates 22 and 32 have a preset predetermined spacing. As a consequence, the accommodating space 33 surrounded by the upper-frame-side swollen portion 31 is formed between the top plates 22 and 32. The accommodating space 33 will be referred to as "the transmitting mechanism accommodating portion 33" or simply referred to as "the accommodating portion 33" hereinafter.

As shown in FIG. 2, the motor holding member 13 is accommodated in the under-frame-side accommodating portion 23. The motor holding member 13 accommodates and holds the cutter blade driving motor 41, and is vertically movable with respect to the traveling frame 11. That is, the rotation of the motor holding member 13 is regulated, and the vertical movement thereof is permitted, with respect to the under frame 20. For example, only the vertical movement of the motor holding member 13 is permitted by a combined structure including guide rails 43 and a slider 44 capable of vertically moving by being guided by the guide rails 43. The guide rails 43 are provided on the inner wall surface of the under-frame-side swollen portion 21 and vertically extend. The slider 44 is provided on the outer wall surface of the motor holding member 13.

Figure 3:
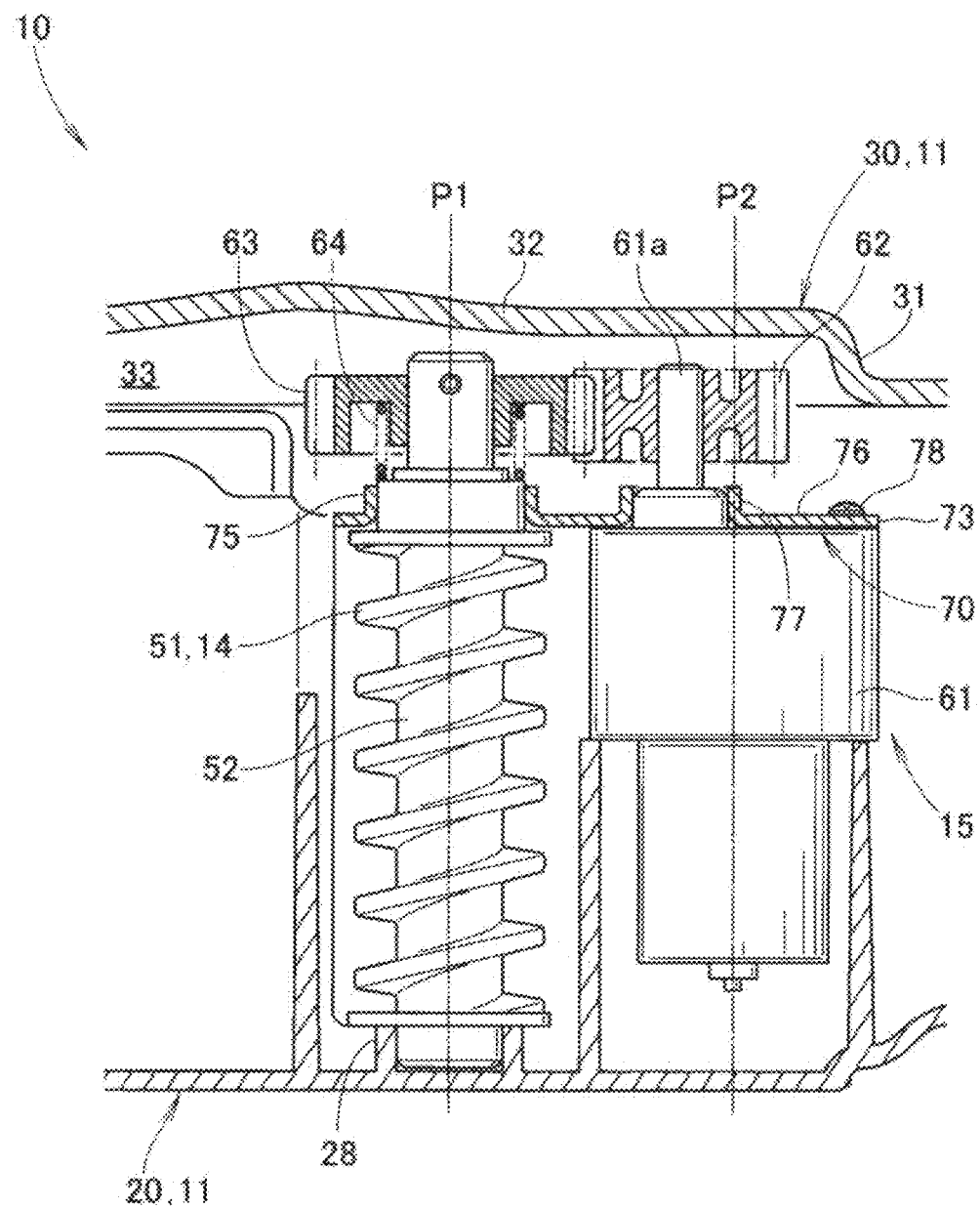
FIG. 3 is a sectional view taken along a line 3-3 in FIG. 2.

The vertical driving member 14 vertically moves the motor holding member 13 when driven by the driving mechanism 15 (see FIG. 3). For example, the vertical driving member 14 includes a screw portion 51 (including a worm) which vertically moves the motor holding member 13. The screw portion 51 is a male screw formed along the axis of a driving shaft 52 extending in the vertical direction. The driving shaft 52 is parallel to the vertical line VH. A rack 53 to be meshed with the screw portion 51 is provided on the outer wall of the motor holding member 13. A plurality of teeth formed on the rack 53 are arrayed in the vertical direction. The helix angle of the screw portion 51 is preferably set at a value which is not inverted by the load from the rack 53. The screw portion 51 and driving shaft 52 are accommodated in the under-frame-side accommodating portion 23.

Figure 6:
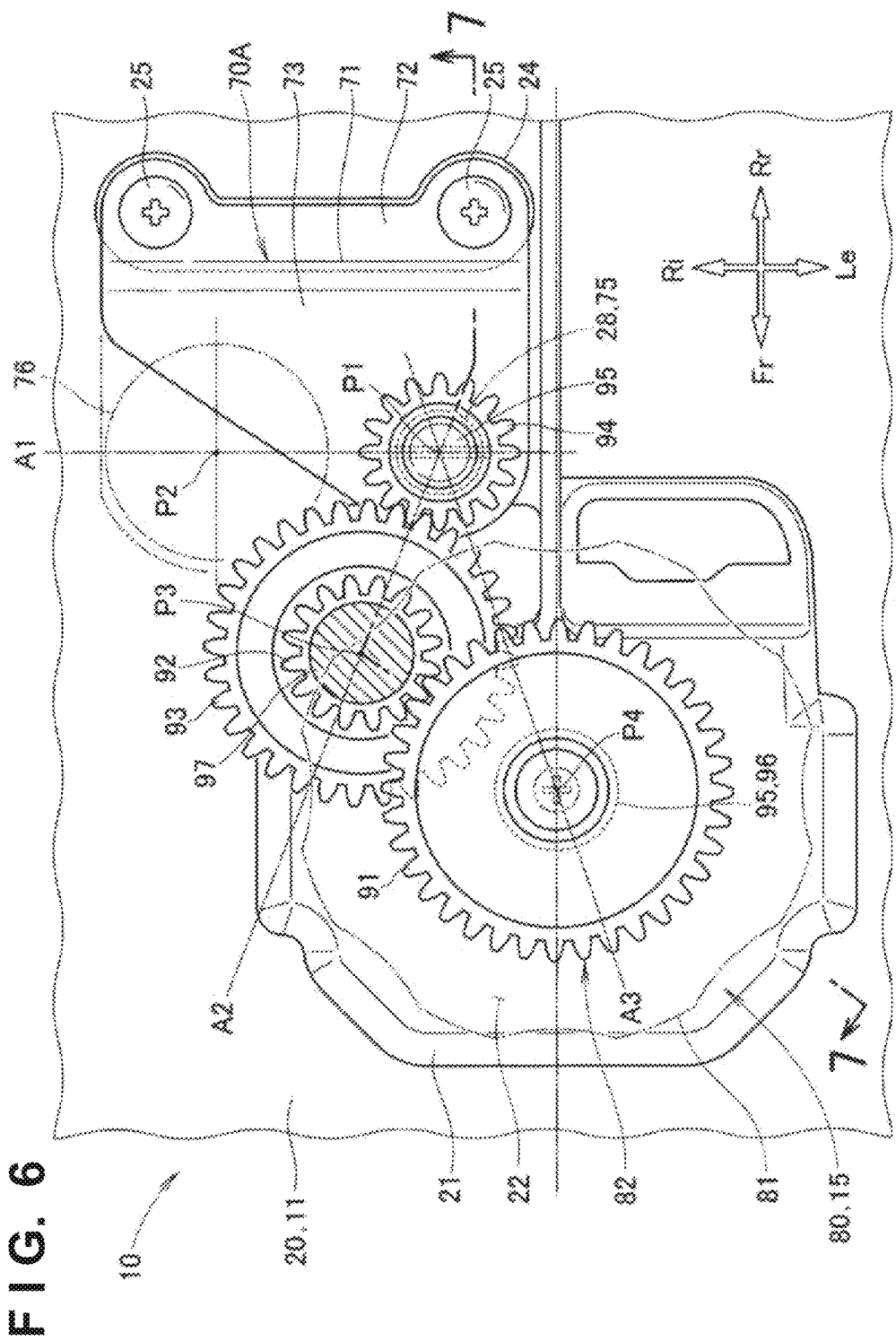
FIG. 6 is a plan view of an under frame including a manual driving mechanism instead of a vertical driving motor shown in FIG. 4 and the vertical driving member.

A method of vertically moving the motor holding member 13 by the driving mechanism 15 (see FIG. 3) is appropriately set to an electrical operation method or manual operation method in accordance with the machine type of the lawn mower 10. As shown in FIG. 3, the electrical type driving mechanism 15 adopts a vertical driving motor 61 for electrically driving the vertical driving member 14. As shown in FIG. 6, the manual type driving mechanism 15 adopts a manual driving mechanism 80 for manually driving the vertical driving member 14. The lawn mower 10 includes one of the vertical driving motor 61 and manual driving mechanism 80 in the traveling frame 11.

First, the driving mechanism 15 adopting the electrical operation method will be explained. As shown in FIG. 3, the driving mechanism 15 adopting the electrical operation method uses the vertical driving motor 61. The vertical driving motor 61 incorporates a speed reduction mechanism, has an output shaft 61a (a motor shaft 61a) extending upward from the upper end, and electrically drives the vertical driving member 14. The output shaft 61a is parallel to the driving shaft 52, and has a driving gear 62.

A driven gear 63 which meshes with the driving gear 62 is provided on the upper end of the driving shaft 52. The rotational speed of the driving gear 62 is reduced by a combination of the driving gear 62 and driven gear 63. A torsion coil spring 64 is wound around the upper end portion of the driving shaft 52. The torsion coil spring 64 biases the driven gear 63 in a direction in which the screw portion 51 raises the rack 53. The driving gear 62 and driven gear 63 are accommodated in the transmitting mechanism accommodating portion 33.

Figure 4:
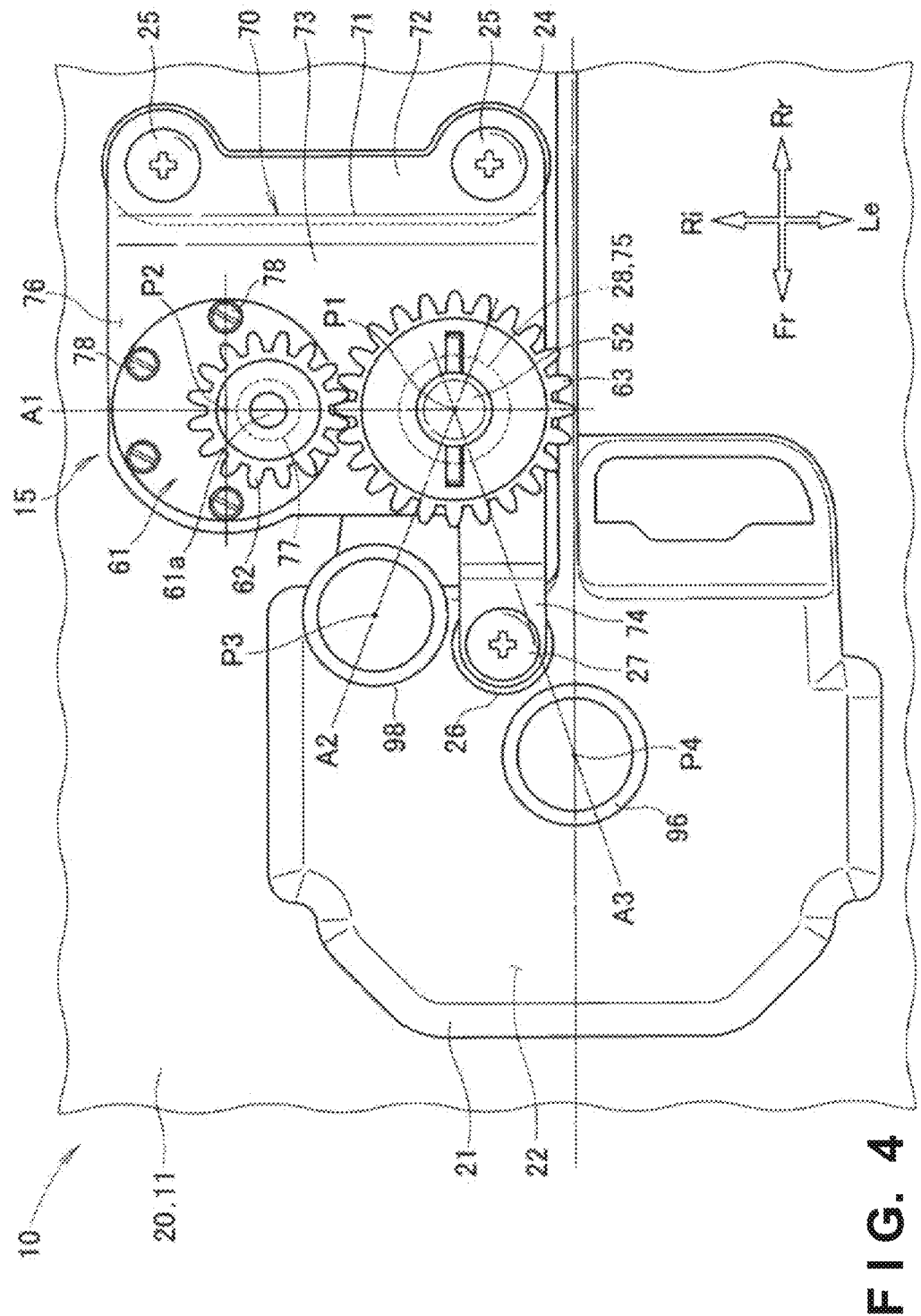
FIG. 4 is a view taken in the direction of an arrow 4 in FIG. 2.

As shown in FIGS. 2 to 4, the power generated by the vertical driving motor 61 is transmitted to the driving shaft 52 via the driving gear 62 and driven gear 63, and the screw portion 51 rotates. The rack 53 vertically moves in accordance with this rotation of the screw portion 51. Consequently, the motor holding member 13 vertically moves, so the heights of the cutter blade driving motor 41 and cutter blade 12 can be adjusted.

Figure 5:
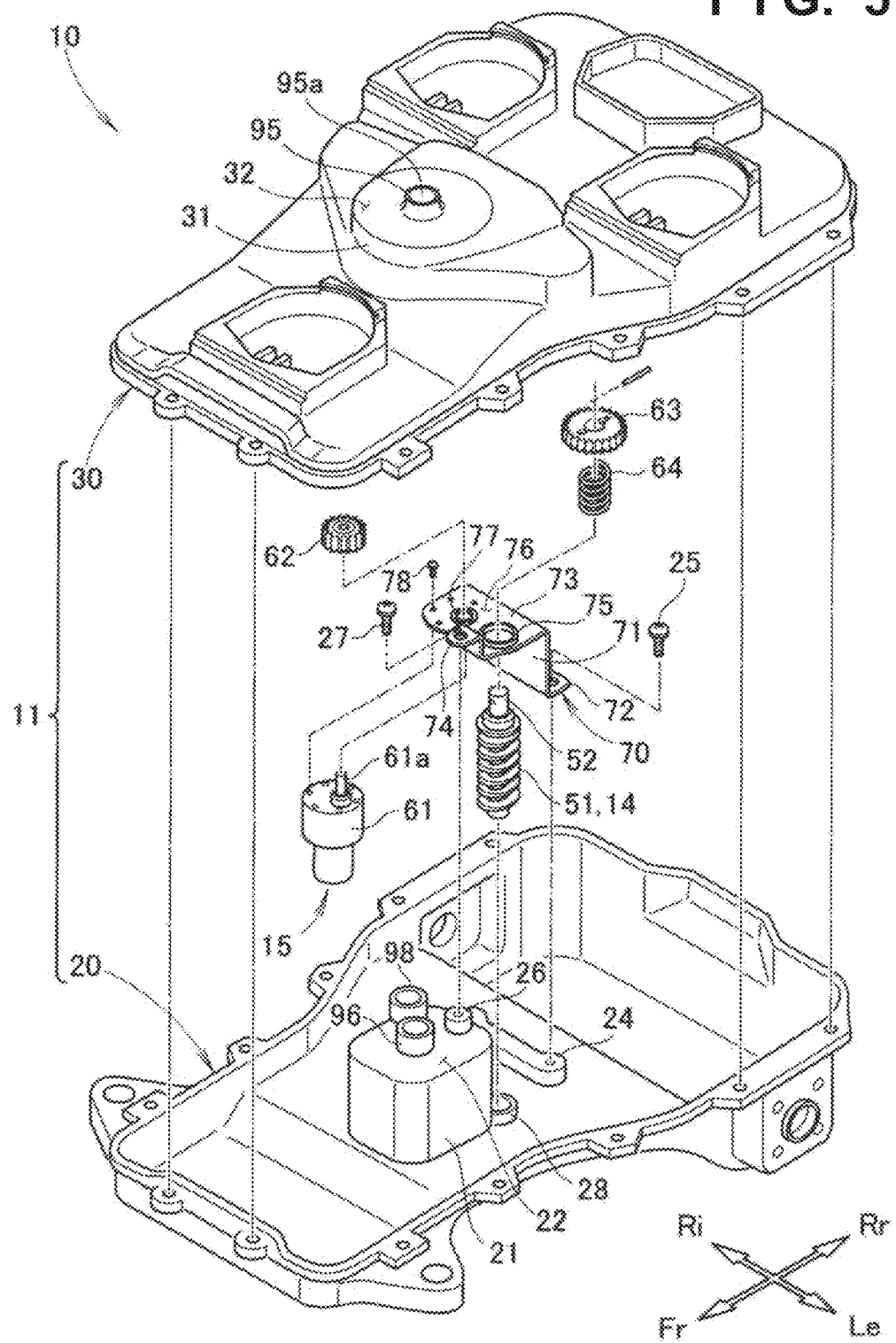
FIG. 5 is an exploded view of the traveling frame, motor holding member, vertical driving member, and driving mechanism shown in FIG. 1.

As shown in FIGS. 2, 3, and 5, an electrical operation bracket 70 is mounted on the upper portion of the under frame 20. The electrical operation bracket 70 is a bent molded product of a plate material. More specifically, the electrical operation bracket 70 includes a longitudinal leg plate 71 having a plate surface facing the front-back direction, a lateral base plate 72 extending backward from the lower end of the leg plate 71, and a lateral bracket plate 73 extending forward from the upper end of the leg plate 71.

The base plate 72 is attached to a boss 24 projecting upward from the under frame 20 by a machine screw 25. A flange 74 is formed at the front end of the bracket plate 73. The flange 74 is attached to a boss 26 projecting upward from the top plate 22 of the under-frame-side swollen portion 21 by a machine screw 27.

An upper end support portion 75, a motor mounting portion 76, and an output shaft support portion 77 are formed on the bracket plate 73. The upper end support portion 75 is a cylindrical portion vertically extending through the bracket plate 73 so as to rotatably support the upper end portion of the driving shaft 52 of the vertical driving member 14. The upper portion of the vertical driving motor 61 can be mounted on the motor mounting portion 76 by a machine screw 78. The output shaft support portion 77 is a cylindrical portion vertically extending through the bracket plate 73 so as to rotatably support the output shaft 41a of the vertical driving motor 61. For example, the upper end support portion 75 and output shaft support portion 77 are integrated with the bracket plate 73 by burring the bracket plate 73.

Furthermore, a lower end support portion 28 is formed on the upper portion of the under frame 20. The lower end support portion 28 rotatably supports the lower end portion of the driving shaft 52 of the vertical driving member 14. Thus, the upper and lower support portions 75 and 28 can support the vertical driving member 14.

As is apparent from the above explanation, the electrical operation bracket 70 is mounted on the traveling frame 11. Accordingly, the traveling frame 11 includes the support portions 75 and 28 capable of supporting the vertical driving member 14, and the motor mounting portion 76 on which the vertical driving motor 61 can be mounted.

Figure 7:
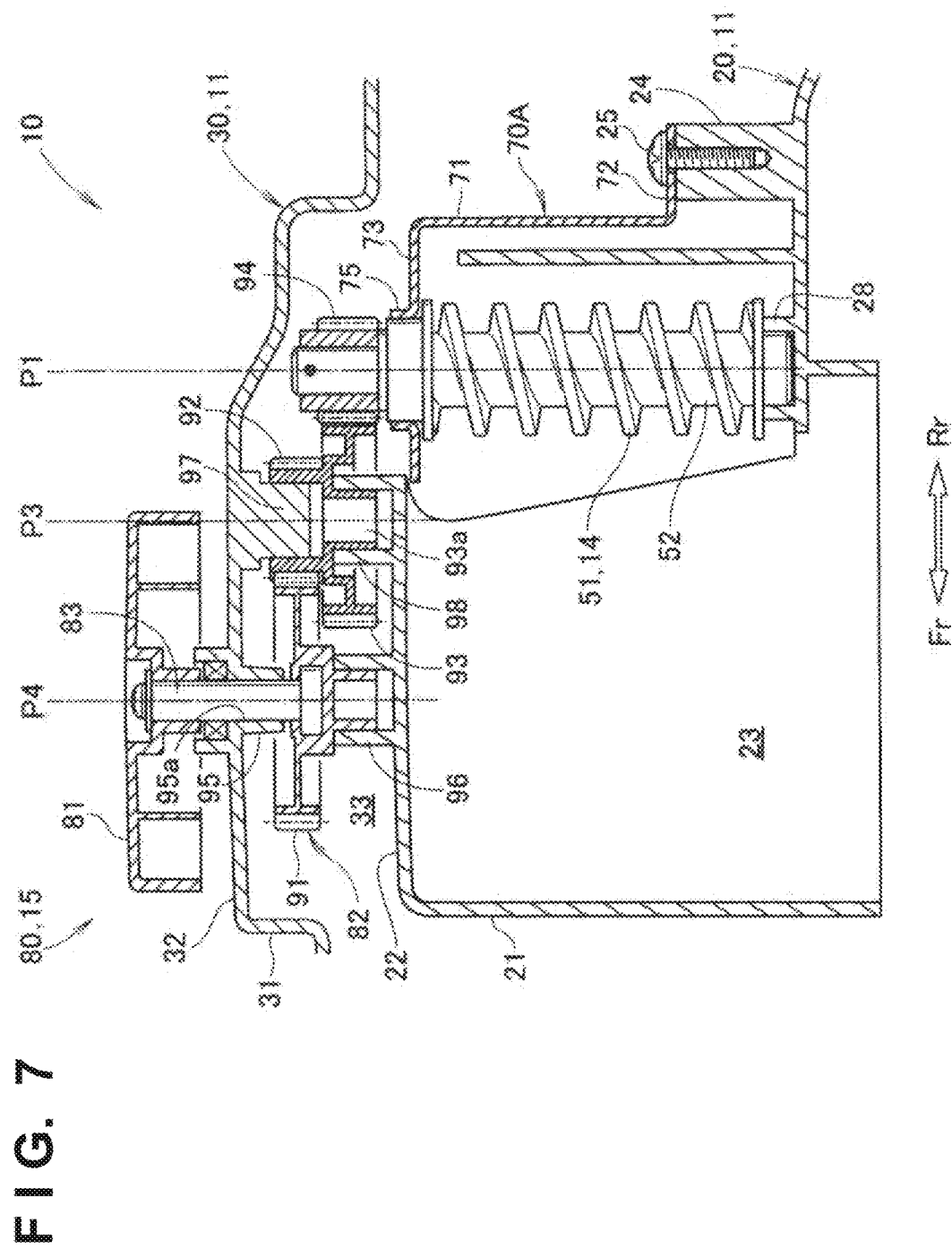
FIG. 7 is a sectional view taken along a line 7-7 in FIG. 6.

Next, the driving mechanism 15 adopting the manual operation method will be explained. As shown in FIGS. 6 and 7, the driving mechanism 15 adopting the manual operation method uses the manual driving mechanism 80. The manual driving mechanism 80 manually drives the vertical driving member 14. The vertical driving member 14 is directly used in this case as well.

Figure 8:
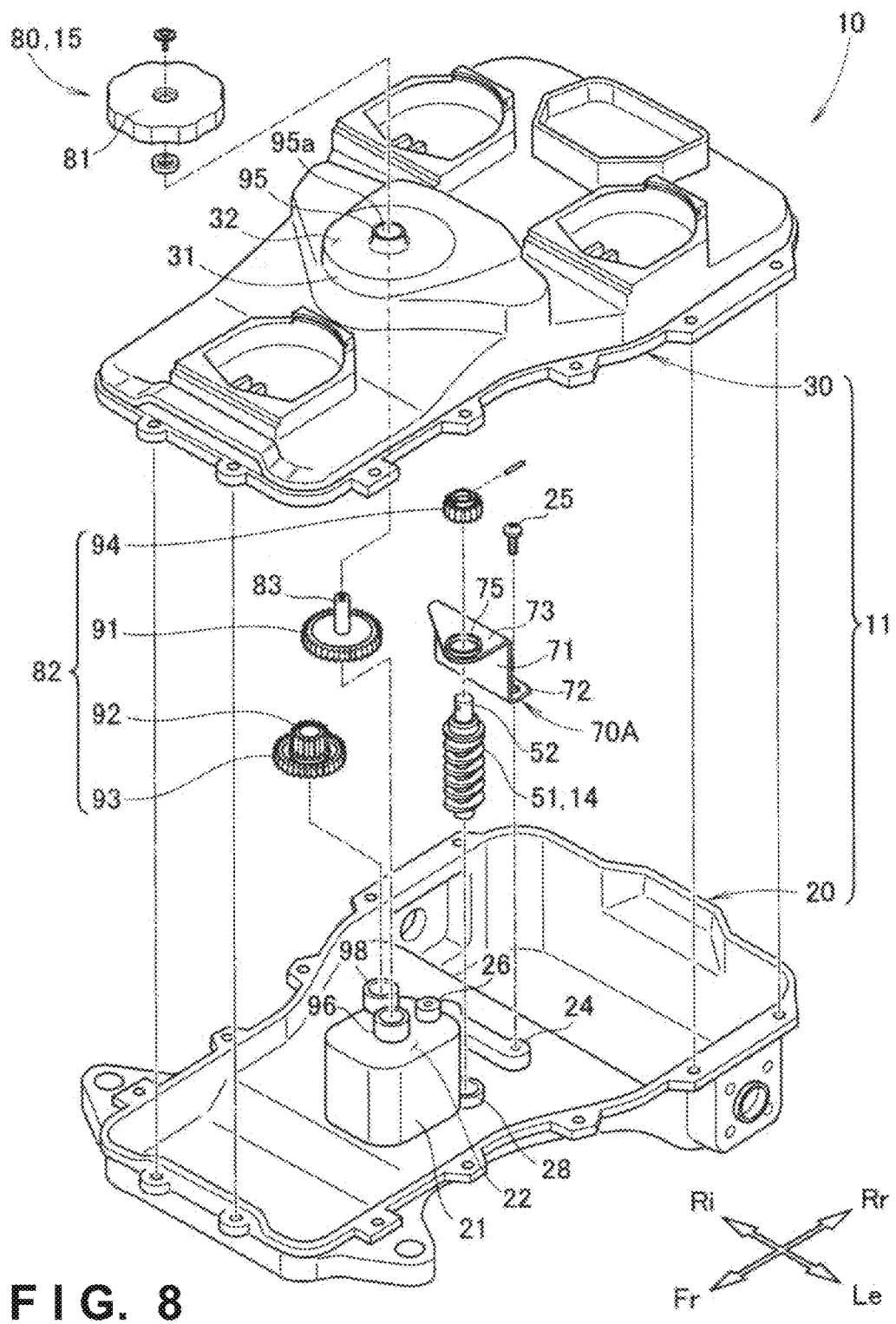
FIG. 8 is an exploded view of the traveling frame, motor holding member, vertical driving member, and manual driving mechanism shown in FIG. 6.

As shown in FIGS. 6 to 8, the manual driving mechanism 80 includes an operation member 81 to be manually rotated, a transmitting mechanism 82 for transmitting the operation power of the operation member 81 to the vertical driving member 14, and a transmission shaft 83 for transmitting the operation power of the operation member 81 to the transmitting mechanism 82.

The operation member 81 is formed by a rotatable knob, and positioned outside (above) the upper frame 30. More specifically, the operation member 81 is positioned right above the top plate 32 of the upper frame 30, and provided at the upper end portion of the transmission shaft 83 extending in the vertical direction. The transmission shaft 83 is parallel to the driving shaft 52 and extends through the top plate 32.

The transmitting mechanism 82 includes a first gear 91 integrated with the lower portion of the transmission shaft 83, a second gear 92 meshed with the first gear 91, a third gear 93 integrated with the second gear 92, and a fourth gear 94 meshed with the third gear 93. The gears 91 to 94 are spur gears. The transmitting mechanism 82 is accommodated in the transmitting mechanism accommodating portion 33.

A first bearing 95 is provided on the top plate 32 of the upper-frame-side swollen portion 31 out of the upper frame 30. The first bearing 95 has a vertically extending through hole 95a. The transmission shaft 83 can extend through the through hole 95a. That is, the through hole 95a rotatably supports the transmission shaft 83.

The lower end portion of the transmission shaft 83, which projects downward to be lower than the first gear 91, is rotatably supported by a second bearing 96. A fitting recess formed in the upper end of the second gear 92 is rotatably supported by a support shaft 97 (a third bearing 97) extending downward from the top plate 32 of the upper-frame-side swollen portion 31. The third gear 93 is positioned concentrically to and right below the second gear 92. A shaft 93a extending downward from the lower end of the third gear 93 is rotatably supported by a fourth bearing 98. The fourth bearing 98 is positioned concentrically to the third bearing 97. The second bearing 96 and fourth bearing 98 extend upward from the top plate 22 of the under-frame-side swollen portion 21.

As described above, the first, second, third, and fourth bearings 95, 96, 97, and 98 are portions (support portions) on which the parts of the manual driving mechanism 80 are mounted, so they will appropriately be referred to as "manual driving mechanism mounting portions 95 to 98" hereinafter. That is, the traveling frame 11 includes the manual driving mechanism mounting portions 95 to 98 capable of mounting the manual driving mechanism 80, in addition to the support portions 75 and 28 and motor mounting portion 76. The manual driving mechanism mounting portions 95 to 98 are provided in the transmitting mechanism accommodating portion 33.

As described above, when the manual operation method is adopted as the driving mechanism 15, a manual operation bracket 70A is used instead of the electrical operation bracket 70 (see FIG. 2). The basic configuration of the manual operation bracket 70A is the same as that of the electrical operation bracket 70. That is, the arrangement of the manual operation bracket 70A is the same as that of the electrical operation bracket 70 except the following features.

First, the motor mounting portion 76 and output shaft support portion 77 are omitted from the bracket plate 73, and the bracket plate 73 is downsized accordingly. Second, the flange 74 is omitted.

As shown in FIGS. 4 and 6, when the traveling frame 11 is viewed from above, the motor mounting portion 76 and manual driving mechanism mounting portions 95 to 98 are positioned in different phases around the support portions 75 and 28.

More specifically, as shown in FIG. 3, assume that a center P1 of the upper and lower support portions 75 and 28 is a first central point P1, and a center P2 of the motor mounting portion 76 is a second central point P2. As shown in FIG. 7, assume that a center P3 of the third and fourth bearings 97 and 98 is a third central point P3, and a center P4 of the first and second bearings 95 and 96 is a fourth central point P4.

As shown in FIGS. 4 and 6, assume that a straight line A1 passing the first central point P1 and second central point P2 is a first line A1, a straight line A2 passing the first central point P1 and third central point P3 is a second line A2, and a straight line A3 passing the first central point P1 and fourth central point P4 is a third line A3, when the traveling frame 11 is viewed from above.

The first line A1, second line A2, and third line A3 are positioned in different phases around the first central point P1. That is, when the traveling frame 11 is viewed from above, the phase of the second line A2 is shifted counterclockwise about 70° from that of the first line A1. The phase of the third line A3 is shifted counterclockwise about 40° from that of the second line A2.

As shown in FIG. 4, therefore, when vertically moving the motor holding member 13 by an electrical operation, the vertical driving motor 61 can be mounted on the motor mounting portion 76 of the traveling frame 11. On the other hand, as shown in FIG. 6, when vertically moving the motor holding member 13 by a manual operation, the manual driving mechanism 80 can be mounted on the manual driving mechanism mounting portions 95 to 98 of the traveling frame 11. In addition, the motor mounting portion 76 and manual driving mechanism mounting portions 95 to 98 are positioned in different phases around the support portions 75 and 28. Accordingly, the motor holding member 13 and manual driving mechanism mounting portions 95 to 98 do not interfere with each other.

The traveling frame 11 includes the support portions 75 and 28, the motor mounting portion 76, and the manual driving mechanism mounting portions 95 to 98 regardless of the method of vertically moving the motor holding member 13. Therefore, although the method of vertically moving the motor holding member 13 includes two kinds of methods, that is, the electrical operation method and manual operation method, at least the traveling frame 11, motor holding member 13, and vertical driving member 14 can be shared. That is, it is possible to maximize the number of parts to be shared by the electrical operation method and manual operation method. Consequently, it is possible to produce the lawn mower 10 by selecting the electrical operation method and manual operation method, and yet reduce the production cost.

Also, as shown in FIG. 7, only the transmitting mechanism 82 of the manual driving mechanism 80 can be accommodated in and attached to the accommodating portion 33 (the transmitting mechanism accommodating portion 33) between the under frame 20 and upper frame 30. The operation power of the operation member 81 positioned outside the upper frame 30 is transmitted to the transmitting mechanism 82 in the accommodating portion 33 by the transmission shaft 83 extending through the through hole 95a of the upper frame 30. Accordingly, the small-sized manual driving mechanism mounting portions 95 to 98 can easily be provided on the side of the support portions 75 and 28 for supporting the vertical driving member 14.

<Summary of Embodiment>

The autonomous lawn mower according to this embodiment includes a traveling frame provided with traveling wheels, a motor holding member, on the traveling frame, capable of vertically moving while holding a cutter blade driving motor, a vertical driving member, on the traveling frame, for vertically moving the motor holding member, and one of a vertical driving motor, on the traveling frame, for electrically driving the vertical driving member and a manual driving mechanism, on the traveling frame, for manually driving it.

The traveling frame includes a support portion capable of supporting the vertical driving member, a motor mounting portion capable of mounting the vertical driving motor, and a manual driving mechanism mounting portion capable of mounting the manual driving mechanism. When the traveling frame is viewed from above, the motor mounting portion and manual driving mechanism mounting portion are positioned in different phases around the support portion.

When vertically moving the motor holding member by an electrical operation, therefore, the vertical driving motor can be mounted on the motor mounting portion of the traveling frame. On the other hand, when vertically moving the motor holding member by a manual operation, the manual driving mechanism can be mounted on the manual driving mechanism mounting portion of the traveling frame. In addition, the motor mounting portion and manual driving mechanism mounting portion are positioned in difference phases around the support portion. Therefore, the motor holding member and manual driving mechanism mounting portion do not interfere with each other. Accordingly, although the method of vertically moving the motor holding member includes two kinds of methods, that is, the electrical operation method and manual operation method, at least the traveling frame, motor holding member, and vertical driving member can be shared. That is, it is possible to maximize the number of parts to be shared by the electrical operation method and manual operation method. As a consequence, it is possible to produce the autonomous lawn mower by selecting the electrical operation method and manual operation method, and yet reduce the production cost.

Preferably, the manual driving mechanism includes an operation member to be manually rotated, and a transmitting mechanism for transmitting the operation power of the operation member to the vertical driving member. The traveling frame includes an under frame to which the traveling wheels are provided, and an upper frame provided on the under frame. An accommodating portion for accommodating the transmitting mechanism is formed between the under frame and upper frame. The operation member is positioned outside the upper frame. A through hole through which a transmission shaft for transmitting the operation power of the operation member to the transmitting mechanism can extend is formed in the upper frame.

Accordingly, only the transmitting mechanism of the manual driving mechanism can be accommodated in and attached to the accommodating portion between the under frame and upper frame. The operation power of the operation member positioned outside the upper frame is transmitted to the transmitting mechanism in the accommodating portion by the transmission shaft extending through the through hole of the upper frame. Therefore, the small-sized manual driving mechanism mounting portion can easily be provided on the side of the support portion for supporting the vertical driving member.

This embodiment can maximize the number of parts to be shared by the electrical operation method and manual operation method. This makes it possible to produce an autonomous lawn mower by selecting the electrical operation method and manual operation method, and yet reduce the production cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-252871, filed on Dec. 25, 2015, which is hereby incorporated by reference herein in its entirety.

What is claimed is:

1. An autonomous lawn mower system comprising:
a traveling frame provided with traveling wheels;
a motor holding member, on the traveling frame, configured to vertically move while holding a cutter blade driving motor;
a vertical driving member, on the traveling frame, configured to vertically move the motor holding member; and
only one of a vertical driving motor and a manual driving mechanism on the traveling frame, the vertical driving motor being configured to electrically drive the vertical driving member, and the manual driving mechanism being configured to manually drive the vertical driving member,
wherein the traveling frame includes:
a support portion configured to support the vertical driving member;
a motor mounting portion configured to mount the vertical driving motor;
a manual driving mechanism mounting portion, which differs from the motor mounting portion, configured to mount the manual driving mechanism;
an under frame, the under frame forming a first swollen portion which swells upward; and
an upper frame, the upper frame forming a second swollen portion which swells upward above the first swollen portion,
when the traveling frame is viewed from above, the motor mounting portion and the manual driving mechanism mounting portion are positioned in different phases around the support portion,
the vertical driving member includes:
a screw portion disposed to be adjacent to the motor holding member, the screw portion being threadedly engaged with a rack formed on an outer wall of the motor holding member; and
a gear coaxially disposed with respect to the screw portion,
the only one of the vertical driving motor and the manual driving mechanism is mounted such that its power is transferred to the motor holding member via the gear and the screw portion,
the motor holding member and the screw portion are disposed below the under frame and in the first swollen portion, and
the gear of the vertical driving member is disposed between the under frame and the upper frame, and in the second swollen portion.

2. The mower system according to claim 1, wherein
the manual driving mechanism includes an operation member to be manually rotated, and a transmitting mechanism configured to transmit an operation power of the operation member to the vertical driving member,
the traveling frame includes an under frame including the traveling wheels, and an upper frame provided on the under frame,
an accommodating portion configured to accommodate and mount the transmitting mechanism is formed between the under frame and the upper frame,
the operation member is positioned outside the upper frame,
a through hole, through which a transmission shaft for transmitting the operation power of the operation member to the transmitting mechanism can extend, is formed in the upper frame, and
the manual driving mechanism mounting portion is provided in the accommodating portion.

3. An autonomous lawn mower system comprising:
a traveling frame provided with traveling wheels;
a motor holding member, on the traveling frame, configured to vertically move while holding a cutter blade driving motor;
a vertical driving member, on the traveling frame, configured to vertically move the motor holding member; and
a vertical driving motor, on the traveling frame, configured to electrically drive the vertical driving member,
wherein the traveling frame includes:
a support portion configured to support the vertical driving member;
a motor mounting portion configured to mount the vertical driving motor;
a manual driving mechanism mounting portion, which differs from the motor mounting portion, configured to mount a manual driving mechanism, the manual driving mechanism being configured to manually drive the vertical driving member and usable instead of the vertical driving motor;
an under frame, the under frame forming a first swollen portion which swells upward; and
an upper frame, the upper frame forming a second swollen portion which swells upward above the first swollen portion,
when the traveling frame is viewed from above, the motor mounting portion and the manual driving mechanism mounting portion are positioned in different phases around the support portion,
the vertical driving member includes:
a screw portion disposed to be adjacent to the motor holding member, the screw portion being threadedly engaged with a rack formed on an outer wall of the motor holding member; and
a gear coaxially disposed with respect to the screw portion,
the vertical driving motor is mounted such that its power is transferred to the motor holding member via the gear and the screw portion,
the motor holding member and the screw portion are disposed below the under frame and in the first swollen portion, and the gear of the vertical driving member is disposed between the under frame and the upper frame, and in the second swollen portion.

4. An autonomous lawn mower system comprising:

a traveling frame provided with traveling wheels;

a motor holding member, on the traveling frame, configured to vertically move while holding a cutter blade driving motor;

a vertical driving member, on the traveling frame, configured to vertically move the motor holding member; and a manual driving mechanism, on the traveling frame, configured to manually drive the vertical driving member, wherein the traveling frame includes:

a support portion configured to support the vertical driving member;

a manual driving mechanism mounting portion configured to mount the manual driving mechanism;

a motor mounting portion, which differs from the manual driving mechanism mounting portion, configured to mount a vertical driving motor, the vertical driving motor being configured to electrically drive the vertical driving member and usable instead of the manual driving mechanism;

an under frame, the under frame forming a first swollen portion which swells upward; and an upper frame, the upper frame forming a second swollen portion which swells upward above the first swollen portion, when the traveling frame is viewed from above, the motor mounting portion and the manual driving mechanism mounting portion are positioned in different phases around the support portion, the vertical driving member includes:

a screw portion disposed to be adjacent to the motor holding member, the screw portion being threadedly engaged with a rack formed on an outer wall of the motor holding member; and a gear coaxially disposed with respect to the screw portion, the manual driving mechanism is mounted such that its power is transferred to the motor holding member via the gear and the screw portion, the motor holding member and the screw portion are disposed below the under frame and in the first swollen portion, and the gear of the vertical driving member is disposed between the under frame and the upper frame, and in the second swollen portion.

5. The mower system according to claim 1, wherein one of the motor mounting portion and the manual driving mechanism mounting portion is located immediately above the motor holding member, and the other is laterally located with respect to the motor holding member.

6. The mower system according to claim 1, wherein a bearing is formed, as at least part of the manual driving mechanism mounting portion, on an upper face of a top plate of the first swollen portion.

7. The mower system according to claim 6, wherein another bearing is formed, as at least part of the support portion, to be adjacent to the first swollen portion in a horizontal direction for the autonomous lawn mower system.

\* \* \* \* \*